United States Patent [19]

Ogawa et al.

[11] Patent Number: 4,652,102
[45] Date of Patent: Mar. 24, 1987

[54] EXPOSURE CORRECTION DEVICE FOR CAMERA

[75] Inventors: Hidehiro Ogawa; Akira Ezawa, both of Tokyo; Kei Ikeda, Yokohama, all of Japan

[73] Assignee: Nippon Kogaku K. K., Tokyo, Japan

[21] Appl. No.: 799,263

[22] Filed: Nov. 18, 1985

[30] Foreign Application Priority Data

Nov. 21, 1984 [JP] Japan .............................. 59-244559
Jun. 21, 1985 [JP] Japan .............................. 60-135408

[51] Int. Cl.$^4$ .............................................. G03B 7/24
[52] U.S. Cl. ...................................................... 354/21
[58] Field of Search .......................................... 354/21

[56] References Cited

U.S. PATENT DOCUMENTS 4,579,433  4/1986  Ishizaka et al. ..................... 354/21

Primary Examiner—Michael L. Gellner
Attorney, Agent, or Firm—Shapiro and Shapiro

[57] ABSTRACT

An exposure correcting device for use in a camera adapted for use with a film container bearing code indicia representing film speed comprises means for manual setting of film speed; correction setting means for manually setting an exposure correction; means for producing a signal corresponding to the inputs of said manual setting means and said correction setting means; means for selecting either a manual mode for manual film speed setting or an automatic mode for automatic film speed setting; and means for determining the exposure value in case of the manual mode by reading a signal from the signal producing means as a film speed code, or in case of the automatic mode by reading said signal from the signal producing means as an exposure correction value and in response to the film speed information from information reading means and to said exposure correction value.

Thus, when an exposure correction is instructed in the automatic mode, the film speed information from the signal producing means is read as an exposure correction value and the film speed information provided for example on the film is corrected according to said correction value. There is not provided any particular means for generating a signal corresponding to the desired exposure correction, and the signal producing means which is used for setting the film speed in the manual mode is used also for this purpose of setting the exposure correction value.

6 Claims, 16 Drawing Figures

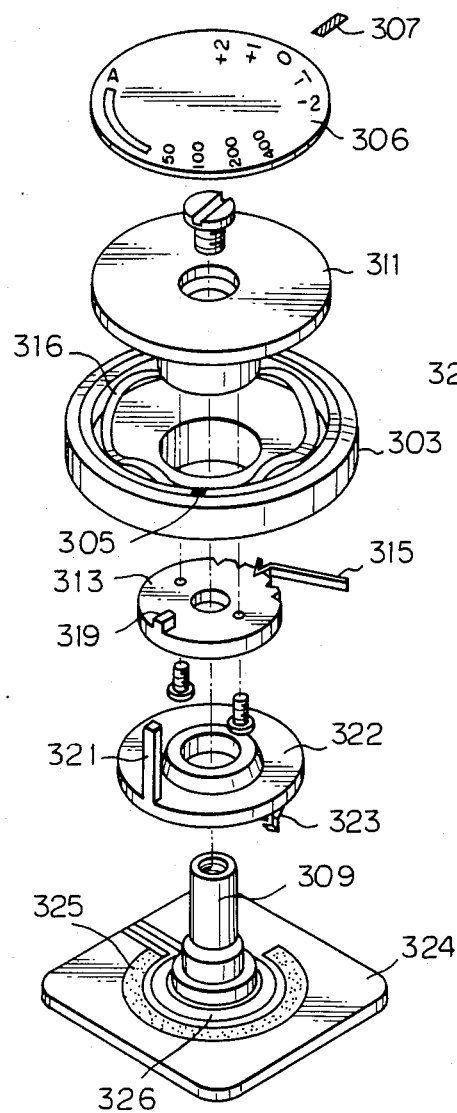
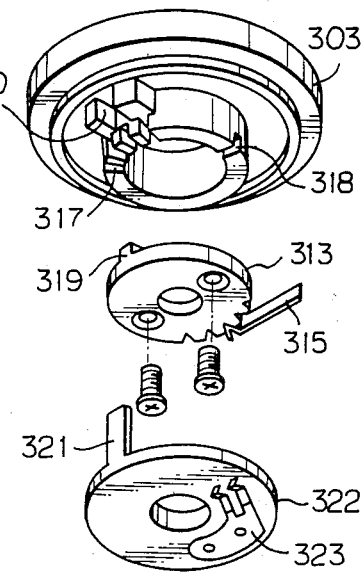
Fig. 13
Fig. 14

EXPOSURE CORRECTION DEVICE FOR CAMERA

BACKGROUND OF THE INVENTION

1. Field of the Invention

The present invention relates to an exposure correcting device for use in a camera, and more particularly to an exposure correcting device for use in a camera in which the film speed can be automatically set by a film speed information provided for example on a film container.

2. Description of the Prior Art

In photographing under extraordinary lighting conditions, for example where the background lighting is so strong that the exposure meter incorporated in the camera is unable to indicate an appropriate exposure value, or where a pushed development is required because of an extremely weak lighting, the desired image has been obtained by a suitable correction on the exposure. In a conventional camera allowing manual exposure setting, such correction of exposure can be achieved by setting the lens aperture or the shutter speed at an aperture value or a time value different from that indicated by the exposure meter. Also such correction of exposure can be made by setting the film speed at a value different from the nominal film speed value of the film loaded in the camera, or by manipulating an exposure correcting dial in case of a camera equipped with such dial. However, in a camera in which the aperture value and/or the time value of the shutter is automatically determined according to a preset time value or aperture value and in response to the indication of an exposure meter, or in a camera employing a program exposure method, such correction of exposure cannot be made by a change in the aperture value or time value but has to be made by a change in the film speed setting or a manipulation of the exposure correcting dial.

Currently there are available certain films bearing film speed information on the film itself or on a container, such as a magazine or a cartridge in which said film is housed. Also there is already known a camera provided with an exposure meter or an automatic exposure adjusting device, a manual film speed setting device for manual setting of the film speed, and an automatic film speed setting device for automatic setting of the film speed in response to the film speed information provided on the film container. In such conventional camera, when loaded with a film bearing above-mentioned film speed information, an automatic setting of the film speed is made according to such film speed information, overriding the film speed setting by said manual setting device or the exposure correction set by said exposure correcting dial.

SUMMARY OF THE INVENTION

The object of the present invention is to provide a camera allowing exposure correction as well as automatic film speed setting.

The present invention is applicable to a camera in which the lens aperture and/or shutter speed is automatically controlled according to the luminance of the object and in which the film speed is automatically set according to the film speed information provided on the film loaded in the camera or on a container of said film, and the device according to the present invention comprises means for manual setting of film speed; correction setting means for manually setting an exposure correction; means for producing a signal corresponding to the inputs of said manual setting means and said correction setting means; means for selecting either a manual mode for manual film speed setting or an automatic mode for automatic film speed setting; and means for determining the exposure value in case of the manual mode by reading a signal from the signal producing means as a film speed code, or in case of the automatic mode by reading said signal from the signal producing means as an exposure correction value and in response to the film speed information from information reading means and to said exposure correction value.

Thus, according to the present invention, when an exposure correction is instructed in the automatic mode, the film speed information from the signal producing means is read as an exposure correction value and the film speed information provided for example on the film is corrected according to said correction value. In the present invention, there is not provided any particular means for generating a signal corresponding to the desired exposure correction, and the signal producing means which is used for setting the film speed in the manual mode is used also for this purpose of setting the exposure correction value.

BRIEF DESCRIPTION OF THE DRAWINGS

FIG. 13 is an exploded perspective view of a part of the camera shown in FIG. 12;

FIG. 14 is a perspective view, seen from below, of a part of the components shown in FIG. 13;

DESCRIPTION OF THE PREFERRED EMBODIMENTS

Figure 1:
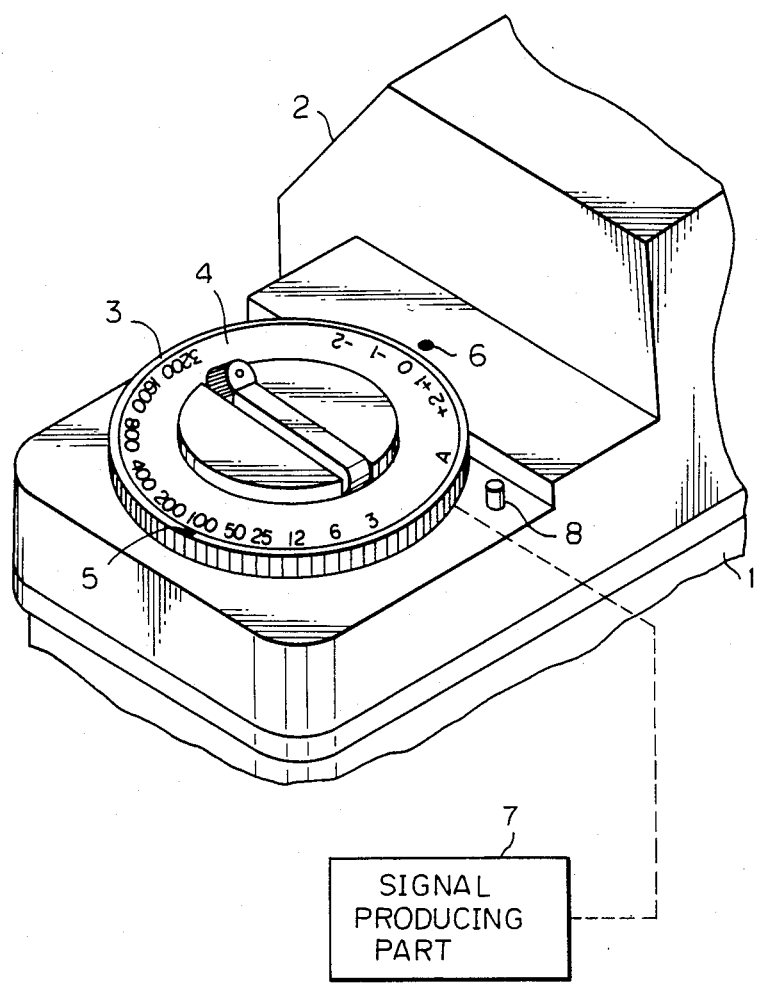
FIG. 1 is a partial perspective view of a camera in which a first embodiment of the present invention is applied.

FIG. 1 shows a first embodiment of the present invention. On an upper cover 2 of a camera body 1, there are rotatably and coaxially provided a film speed setting ring 3 and an indicator dial 4. Said indicator dial 4 is provided thereon with a film speed scale showing film speeds from ISO 3 to ISO 3200 in numbers, a symbol "A" representing automatic film speed setting, and an exposure correction scale from +2 to −2 EV. The setting ring 3 bears a pointer mark 5 corresponding to said film speeds and symbol "A", while the upper cover 2 is provided with a pointer mark 6 for said exposure correction scale. Said setting ring 3 and indicator dial 4 are connected to a signal producing part 7 which will be explained later.

By rotation in an uplifted state, the setting ring 3 can be moved with respect to the indicator dial 4, so that the pointer mark 5 can be brought to a desired film speed value. On the other hand, the setting ring 3 and the indicator ring 4 can be rotated together by rotation while a button 8 is depressed, so that the pointer mark 6 can be matched with a desired exposure correction value.

Figure 2:
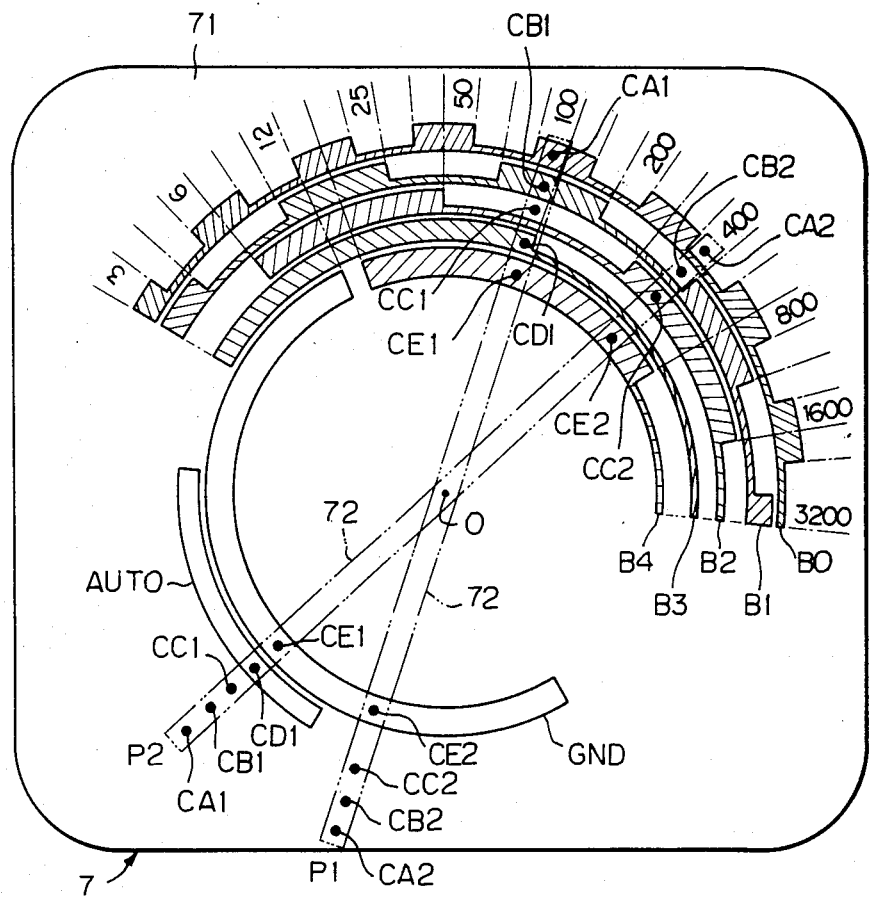
FIG. 2 is a plan view showing an example of a circuit board in the signal producing part shown in FIG. 1.

As shown in FIG. 2, the signal producing part 2 is provided with a circuit board 71 bearing various patterns and a brush 72 sliding on said circuit board 71 and linked with said setting ring 3 and indicator dial 4. In FIG. 2 the brush 72 is positioned at P1 or P2.

Figure 3:
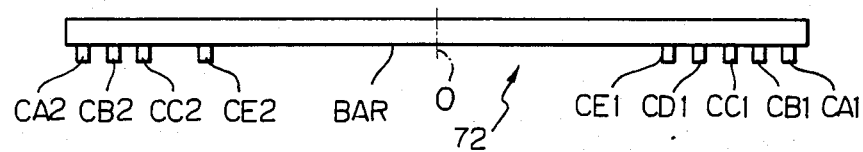
FIG. 3 is a lateral view showing an example of brushes shown in FIG. 2.

As shown in FIG. 3, the brush 72 is composed of a conductive support member BAR, contacts CA1, CB1, CC1, CD1 and CE1 provided at a determined pitch on one arm of said support member BAR, and other contacts CA2, CB2, CC2 and CE2 provided at a determined pitch on the other arm of said support member BAR. Contacts CA1 and CA2, CB1 and CB2, CC1 and CC2 or CE1 and CE2 are respectively positioned at a same distance from the center O of rotation.

Referring to FIG. 2, the code patterns on the circuit board 71 are composed of an arc-shaped outermost bit pattern B0 positioned substantially corresponding to the radial position of the contacts CA1 and CA2; an arc-shaped bit pattern B1 positioned corresponding to the radial position of the contacts CB1 and CB2; an arc-shaped bit pattern B2 positioned corresponding to the radial position of the contacts CC1 and CC2; an arc-shaped bit pattern B3 positioned corresponding to the radial position of the contact CD1; and an arc-shaped bit pattern B4 positioned corresponding to the radial position of the contacts CE1 and CE2. Each of said bit patterns B0-B4 is provided with contact pads (represented by hatched areas) of a determined angular width, and the number of said contact pads is largest on the bit pattern B0 and becomes fewer in the inner bit patterns, while the angular width of said contact pads becomes larger in the inner bit patterns. The entire bit patterns occupy an angle smaller than 180°.

Opposed to said bit patterns there is provided a grounding pattern GND on a circle of said bit pattern B4, and an automatic pattern AUTO, for identifying the automatic film speed setting mode, on an outer circle of said bit pattern B3. Said bit patterns B0-B4 and automatic pattern AUTO are given a determined voltage, while the grounding pattern GND is grounded.

When the contacts CA1-CE1 are positioned in an angular range between ISO 3 and 3200 shown in FIG. 2, for example at a position P1, the contact CE2 is in contact with the grounding pattern GND but the automatic contact AUTO is not contacted. Consequently a high-level signal is always obtained therefrom to identify the manual film speed setting mode. On the other hand, the contacts CA1-CE1 are grounded through the contact CE2, so that each contact pad of the bit pattern provides a low-level signal or a high-level signal respectively when it is contacted by a brush contact or not.

In the above-mentioned case, therefore, the manual setting mode is selected, and the bit patterns provide signals corresponding to the ISO film speeds as shown in the "manual" column in Tab. 1. As an example, in the brush position P1 shown in FIG. 2, the manual film speed setting mode is selected and code data "00100" are obtained corresponding to a film speed ISO 100.

TABLE 1

| Brush position ISO | Film speed setting mode | | | | | | | Auto Exposure Correction value |
|---|---|---|---|---|---|---|---|---|
| | Manual | | | | | Auto | Auto | |
| | Bit Patterns | | | | | | | |
| | B4 | B3 | B2 | B1 | B0 | | | |
| 3200 | 1 | 1 | 1 | 0 | 1 | 1 | 0 | −2 |
| 2500 | 1 | 1 | 1 | 1 | 1 | 1 | 0 | −5/3 |
| 2000 | 1 | 1 | 1 | 1 | 0 | 1 | 0 | −4/3 |
| 1600 | 1 | 1 | 0 | 1 | 0 | 1 | 0 | −1 |
| 1200 | 1 | 1 | 0 | 1 | 1 | 1 | 0 | −⅔ |
| 1000 | 1 | 1 | 0 | 0 | 1 | 1 | 0 | −⅓ |
| 800 | 1 | 1 | 0 | 0 | 0 | 1 | 0 | 0 |
| 640 | 0 | 1 | 0 | 0 | 0 | 1 | 0 | +⅓ |
| 500 | 0 | 1 | 0 | 0 | 1 | 1 | 0 | +⅔ |
| 400 | 0 | 1 | 0 | 1 | 1 | 1 | 0 | +1 |
| 320 | 0 | 1 | 0 | 1 | 0 | 1 | 0 | +4/3 |
| 250 | 0 | 1 | 1 | 1 | 0 | 1 | 0 | +5/3 |
| 200 | 0 | 1 | 1 | 1 | 1 | 1 | 0 | +2 |
| 160 | 0 | 1 | 1 | 0 | 1 | 1 | | |
| 125 | 0 | 1 | 1 | 0 | 0 | 1 | | |
| 100 | 0 | 0 | 1 | 0 | 0 | 1 | | |
| 80 | 0 | 0 | 1 | 0 | 1 | 1 | | |
| 64 | 0 | 0 | 1 | 1 | 1 | 1 | | |
| 50 | 0 | 0 | 1 | 1 | 0 | 1 | | |
| 40 | 0 | 0 | 0 | 1 | 0 | 1 | | |
| 32 | 0 | 0 | 0 | 1 | 1 | 1 | | |
| 25 | 0 | 0 | 0 | 0 | 1 | 1 | | |
| 20 | 0 | 0 | 0 | 0 | 0 | 1 | | |
| 16 | 1 | 0 | 0 | 0 | 0 | 1 | | |
| 12 | 1 | 0 | 0 | 0 | 1 | 1 | | |
| 10 | 1 | 0 | 0 | 1 | 1 | 1 | | — |
| 8 | 1 | 0 | 0 | 1 | 0 | 1 | | |
| 6 | 1 | 0 | 1 | 1 | 0 | 1 | | |
| 5 | 1 | 0 | 1 | 1 | 1 | 1 | | |
| 4 | 1 | 0 | 1 | 0 | 1 | 1 | | |
| 3 | 1 | 0 | 1 | 0 | 0 | 1 | | |

On the other hand, in case the contact CD1 slides on the automatic pattern AUTO, for example at a position P2, the automatic pattern AUTO provides a low-level signal indicating the automatic film speed setting mode, in which the film speed is set by the data attached to the film container, regardless of the position of the setting ring 3, i.e. regardless of the film speed code supplied from the bit patterns B0-B4.

In this state, the bit patterns provide film speed codes corresponding to ISO 200 to 3200, which, in the present embodiment, are converted into exposure correction values of +2 to −2 EV while the automatic pattern AUTO provides a low-level signal, as will be explained later in more detail.

Figure 4:
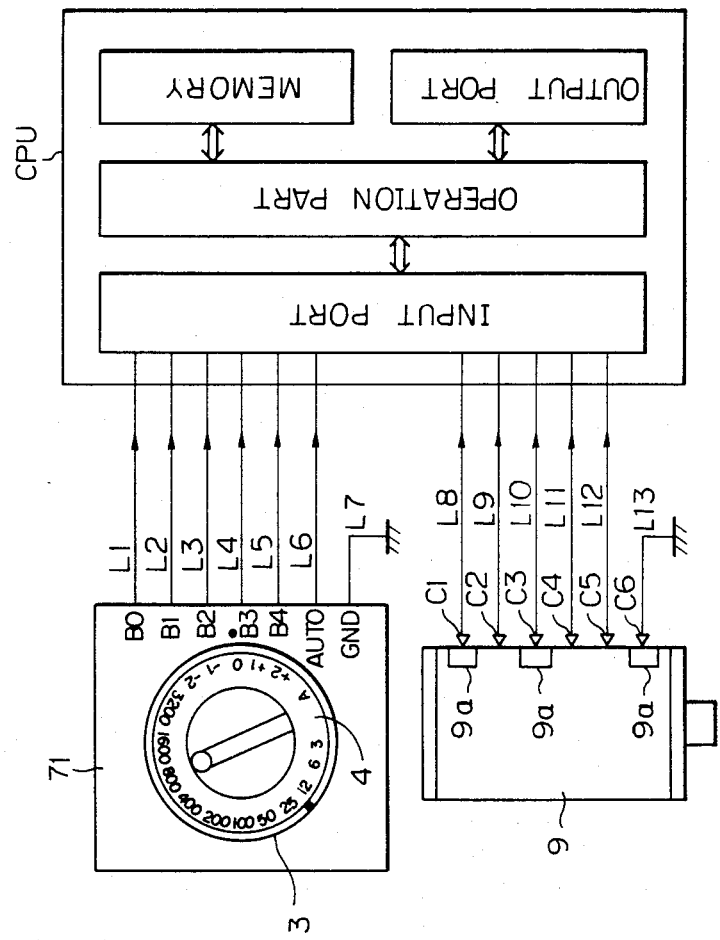
FIG. 4 is a block diagram showing connection between CPU and contacts provided in the signal producing part and in a film chamber.
Figure 5:
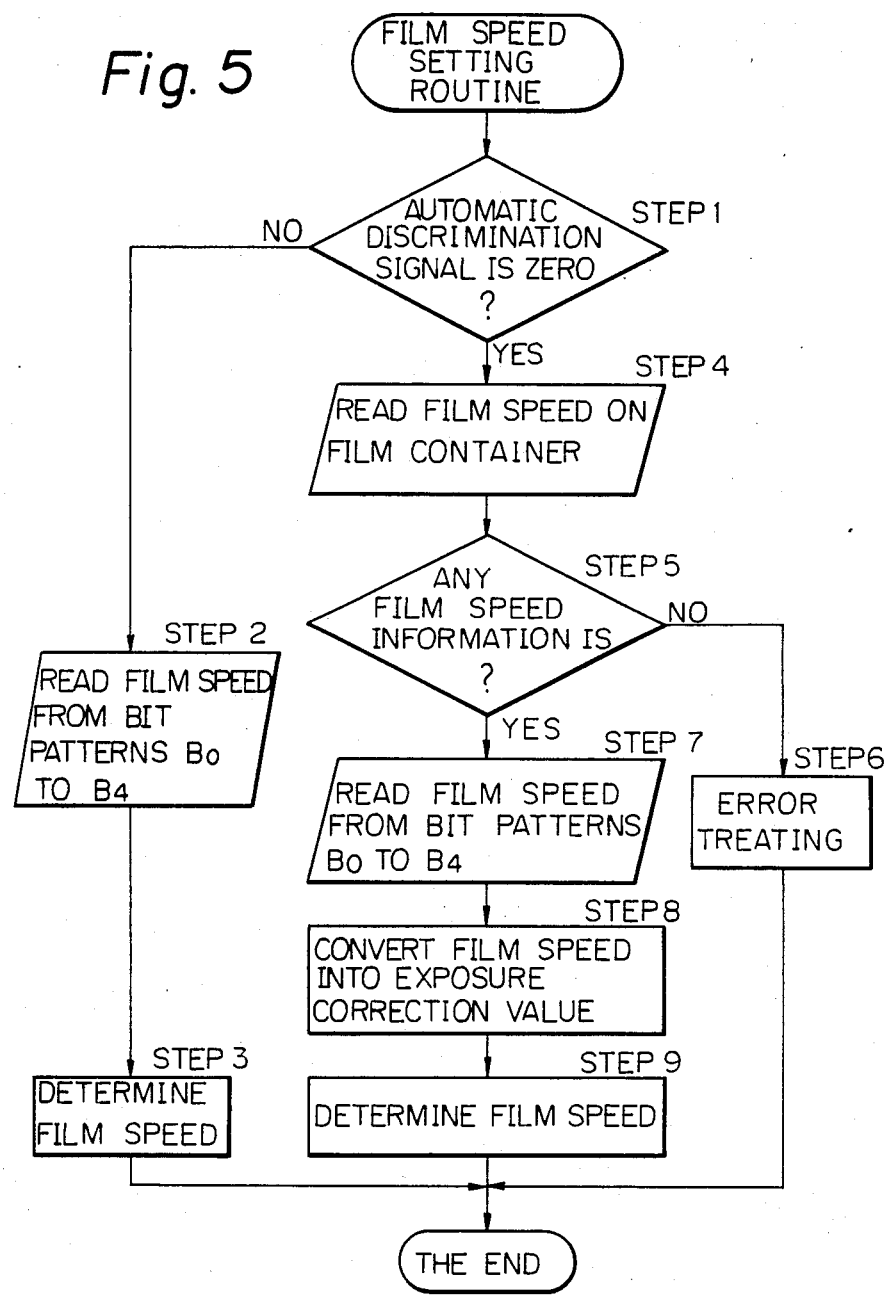
FIG. 5 is a flow chart showing an example of film speed setting routine.

Now reference is made to FIGS. 4 and 5 for further clarifying the present embodiment.

As shown in FIG. 4, the conductor patterns B0-B4 and AUTO on the circuit board 71 are connected, through signal lines L1-L6, to a central processing unit CPU, while the grounding pattern GND is grounded through a signal line L7. Also information reading contacts C1-C5 provided in a film chamber of the camera are connected to the CPU through signal lines L8-L12, while a grounding contact C6 is grounded through a signal line L13. The CPU is provided with input ports, output ports, a memory and an operation part. On the external periphery of the film container 9 there are provided code indicia 9a representing the film speed.

Said memory stores a film speed setting routine program shown in FIG. 5, and a table of exposure correction values of +2 to -2 EV respectively corresponding to the ISO speeds 200 to 3200 as shown in Tab. 2.

TABLE 2

| Exposure correction value | Film speed code | | | | | ISO speed |
|---|---|---|---|---|---|---|
| -2    | 1 | 1 | 1 | 0 | 1 | 3200 |
| -5/3  | 1 | 1 | 1 | 1 | 1 | 2500 |
| -4/3  | 1 | 1 | 1 | 1 | 0 | 2000 |
| -1    | 1 | 1 | 0 | 1 | 0 | 1600 |
| -2/3  | 1 | 1 | 0 | 1 | 1 | 1200 |
| -1/3  | 1 | 1 | 0 | 0 | 1 | 1000 |
| 0     | 1 | 1 | 0 | 0 | 0 | 800 |
| +1/3  | 0 | 1 | 0 | 0 | 0 | 640 |
| +2/3  | 0 | 1 | 0 | 0 | 1 | 500 |
| +1    | 0 | 1 | 0 | 1 | 1 | 400 |
| +4/3  | 0 | 1 | 0 | 1 | 0 | 320 |
| +5/3  | 0 | 1 | 1 | 1 | 0 | 250 |
| +2    | 0 | 1 | 1 | 1 | 1 | 200 |

When the program shown in FIG. 5 is activated, a step 1 identifies if the automatic discrimination signal is zero. If not, the program proceeds to a step 2 for receiving the film speed code from the bit patterns B0–B4 for manual film speed setting, and a step 3 determines the film speed. On the other hand, if the identification in the step 1 results affirmative, the program proceeds to a step 4 for receiving the film speed information from the film container. Then a step 5 identifies whether the film speed information has been present, and, if not, the program proceeds to a step 6 for an error process, for example of providing a sound alarm or prohibiting shutter release.

If the film speed information is present the program proceeds to a step 7 for receiving a film speed code from the bit patterns B0–B4, and a step 8 converts thus received film speed code into an exposure correction value by means of a table shown in FIG. 2. A succeeding step 9 corrects the film speed, received in the step 4, by means of the exposure correction value calculated in the step 8, thus finally determining the film speed.

In summary, in the present embodiment, the film speed is determined by the film speed code received from the bit patterns B0–B4 when the automatic discrimination signal is at "1". On the other hand, if said signal is "0", the final film speed is determined by correcting the film speed, read from the film container, with the exposure correction value obtained from the film speed code read from the bit patterns B0–B4. In this manner the exposure value, determined from the film speed, shutter speed and lens aperture, can be corrected.

The bit pattern B3 does not have a contact pad in an angular range in which the brush contact CD1 is in contact with the automatic pattern AUTO, so that said bit pattern B3 always provides a high-level output signal in said range. Because of the lack of a contact CD2, the automatic pattern AUTO does not touch any contact when the brush contacts CA1-CE1 slide on the bit patterns B0–B4. In this manner there is obtained the automatic discrimination signal, of which level indicates the automatic or manual film speed setting mode. The automatic pattern AUTO can be positioned on a same radial position as the bit pattern B3, so that the circuit board can be made smaller. Also the grounding pattern GND is so positioned over an angular range of 180° or longer as not to interfere with the bit patterns B0–B4, whereby the brush contact CE1 or CE2 is always in contact with said grounding pattern regardless of the position of the brush 72. Consequently the grounding pattern can be positioned on a same radial position as the bit pattern B4 and the conductor patterns can therefore be constructed smaller. In this manner a signal of 7 bits, corresponding to the bit patterns B0–B4, automatic pattern AUTO and grounding pattern GND can be obtained from conductors positioned on five circles, and the circuit board can therefore be realized in a very compact form.

A further compactization of the board is possible by placing the bit pattern B0 on the circle of the bit pattern B1 but in a radially opposed position, thus forming seven patterns on four concentric circles. In this case the brush can also be simplified as the contacts CA1 and CA2 can be dispensed with.

In more general terms, a signal of n bits can be obtained by forming n patterns on n or (n+1)/2 concentric circles respectively when n is even or odd.

Figure 6:
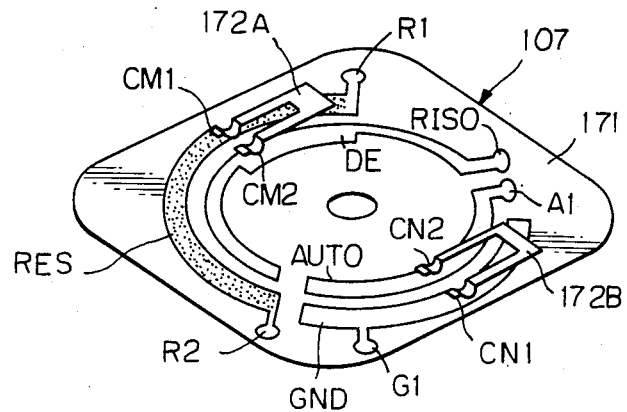
FIG. 6 is a perspective view of a signal producing part in a second embodiment of the present invention.

FIG. 6 shows a second embodiment in which a voltage is obtained corresponding to the film speed, instead of the film speed code in the foregoing first embodiment. A signal producing part 107 is provided with a circuit board 171 and a pair of brushes 172A, 172B sliding thereon. Said brushes are fixed in radially opposed positions, and the brush 172A is provided with a pair of contacts CM1, CM2 while the brush 172B is provided with a pair of contacts CN1, CN2.

The circuit board 171 is provided with a resistor pattern RES; a voltage detecting pattern DE for obtaining a voltage corresponding to the position of the brushes; an automatic discrimination pattern AUTO for identifying an automatic or manual film speed setting mode; and a grounding pattern GND, the latter three of which are composed of gold-plated conductor patterns.

Figure 7:
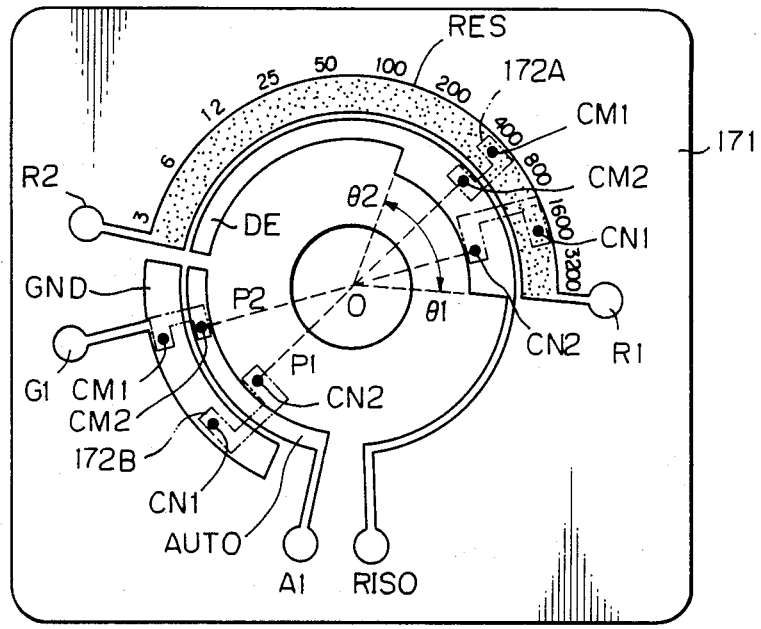
FIG. 7 is a plan view thereof.

Referring to FIG. 7, terminals R1 and R2 of the resistor pattern RES and the automatic discrimination pattern AUTO receive respectively determined voltages. When the brush contact CM1 is in contact with the resistor pattern RES, for example at a position P1, the terminal A1 of said automatic discrimination pattern AUTO assumes the above-mentioned voltage since said pattern is not in contact with any brush contact. In this state, a terminal RISO of the voltage detecting pattern DE releases a voltage corresponding to the position of the brush contact CM1, and said voltage is supplied, after conversion into a digital value in an A/D converter, to a control circuit such as the CPU shown in FIG. 4. The terminal A1 of the automatic discrimination pattern AUTO is also connected to said control circuit, so that, when said terminal A1 is at the above-mentioned voltage, analog voltage obtained from the terminal RISO of the voltage detecting pattern DE is used as the film speed information for determining the film speed.

On the other hand, when the brush contact CN1 is on the voltage detecting pattern DE, for example at a position P2, the brush contact CM2 is in contact with the automatic discrimination pattern AUTO whereby the terminal A1 thereof is maintained at the ground potential. In this state the terminal RISO of the voltage detecting pattern DE provides a voltage corresponding to the position of the brush contact CN1. The control circuit identifies the automatic film speed setting mode when said terminal A1 is at the ground potential, and the film speed information from the terminal RISO of the voltage detecting pattern DE is used for obtaining an exposure correction value, by means of a table similar to that shown in Tab. 2. The above-explained procedure can be executed in a similar manner as explained in FIG. 5.

In the present embodiment, the exposure correction values are determined in relation to the voltage corresponding to film speeds from ISO 200 to 3200.

In the following there are shown certain embodiments in which a manually set exposure correction value is added to the film speed information obtained from the film container, in case the automatic film speed setting mode is selected.

Figure 8:
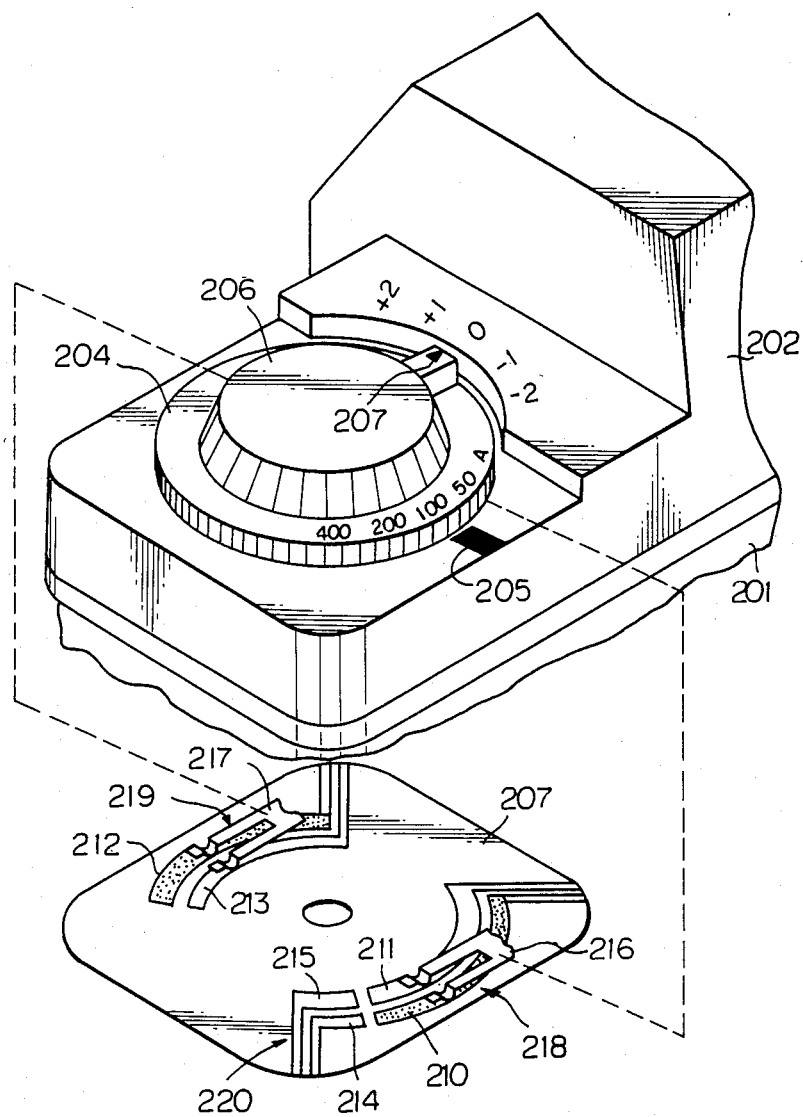
FIG. 8 is a partial perspective view of a camera in which a third embodiment of the present invention is applied.

In FIG. 8, a setting dial 204, positioned on an upper cover 202 of a camera body 201, is provided with a film speed scale indicating film speeds in numbers and a symbol "A" indicating a position for automatic film speed setting. Said upper cover 202 is provided thereon with a pointer mark 205 for matching with one of said film speeds or with the symbol "A". On said setting dial 204 there is provided an exposure correction dial 206, which is coaxial with said setting dial 204 but is independently rotatable so that a pointer mark 207 on the dial 206 can be positioned arbitrarily on an exposure correction scale provided on the upper cover 202.

A circuit board 207 is provided with resistor strips 210, 212 and conductors 211, 213, 214 and 215. A brush 216, integrally rotatable with the setting dial 204 slides over the resistor 210 and conductor 211, and comes into contact with conductors 214 and 215 when the symbol A is matched with the pointer mark 205. Another brush 217, integrally rotatable with the dial 206 slides over the resistor 212 and conductor 213. The resistor 210, conductor 211 and brush 216 constitute a variable resistor 218, while the resistor 212, conductor 213 and brush 217 constitute another variable resistor 219. Also the conductors 214, 215 and brush 216 constitute a selector switch 220.

Figure 9:
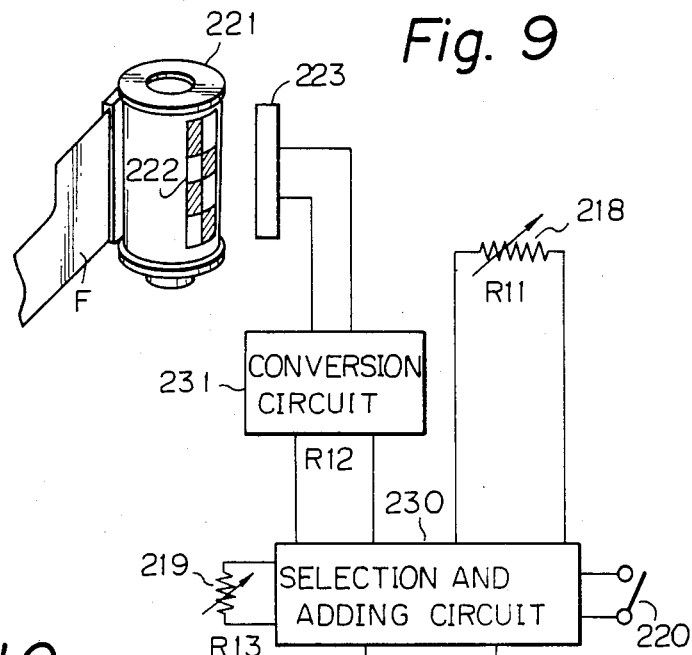
FIG. 9 is a block diagram of an electric circuit of the embodiment shown in FIG. 8.

The camera shown in FIG. 8 is further provided with components shown in FIG. 9. In the manual film speed setting mode, the set value is supplied, as a resistance R11 of the variable resistor 218, to a selection and addition circuit 230. On the other hand, code indicia 222 provided on a film container 221 loaded in a film chamber of the camera are detected by a detecting device 223 provided in said camera and the obtained detection signal is converted, in a conversion circuit 231, into a resistance R12 corresponding to the film speed of the loaded film. Said film speed signal, represented by the resistance R12, is also supplied to said selection and addition circuit 230.

Said selection and addition circuit 230 selects either the information on the resistance R12 supplied from the conversion circuit 231 in the automatic setting mode in which the selector switch 220 is closed, or the information on the resistance R11 from the variable resistor 218 in the manual setting mode in which the selector switch 220 is open.

The exposure correction value is given as the resistance R13 of the variable resistor 219. Said resistance R13 is added to the resistance R11 or R12 selected by the selection and addition circuit 230, and a resulting synthesized resistance R14 or R14' is supplied to an exposure operation circuit 232.

Figure 10:
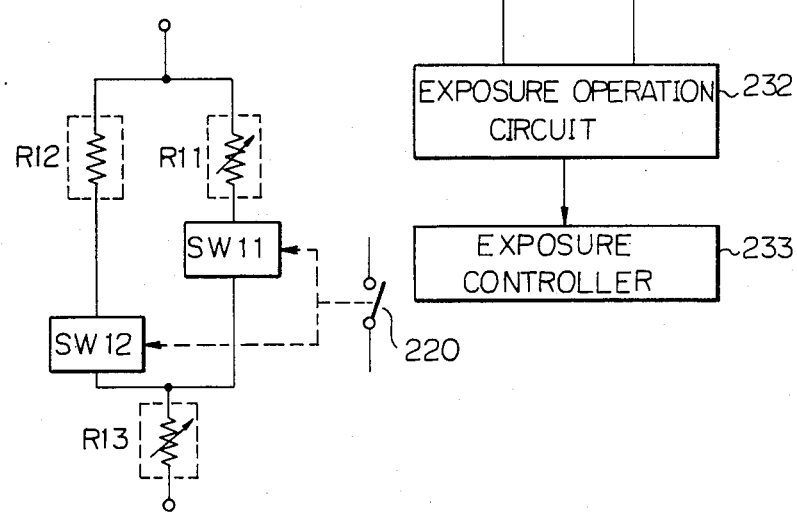
FIG. 10 is a circuit diagram showing an example of a selection and addition circuit.

FIG. 10 shows the structure of the selection and addition circuit, wherein a switching element SW11 connected to the variable resistor R11 is rendered conductive while the selector switch 220 is open, while a switching element SW12 connected to the variable resistor R12 is rendered conductive while the selector switch 220 is closed. Thus, when the switching element SW11 is closed, a resistance equal to the sum of R11 and R13 appears across the terminals.

The exposure correction is achieved by rotation of the dial 206 of match the pointer mark 207 with one of the gradations from +2 to −2 EV, and such exposure correction is possible both in the manual and automatic film speed setting modes. The exposure correction value, represented by the resistance R13 of the variable resistor 219, is added to the resistance R11 or R12 selected by the selection and addition circuit 230 and supplied to the exposure operation circuit 232. Appropriate aperture value and/or shutter time value is determined by the calculation in said operation circuit 232, and the exposure is controlled by an exposure controller 233.

Figure 11:
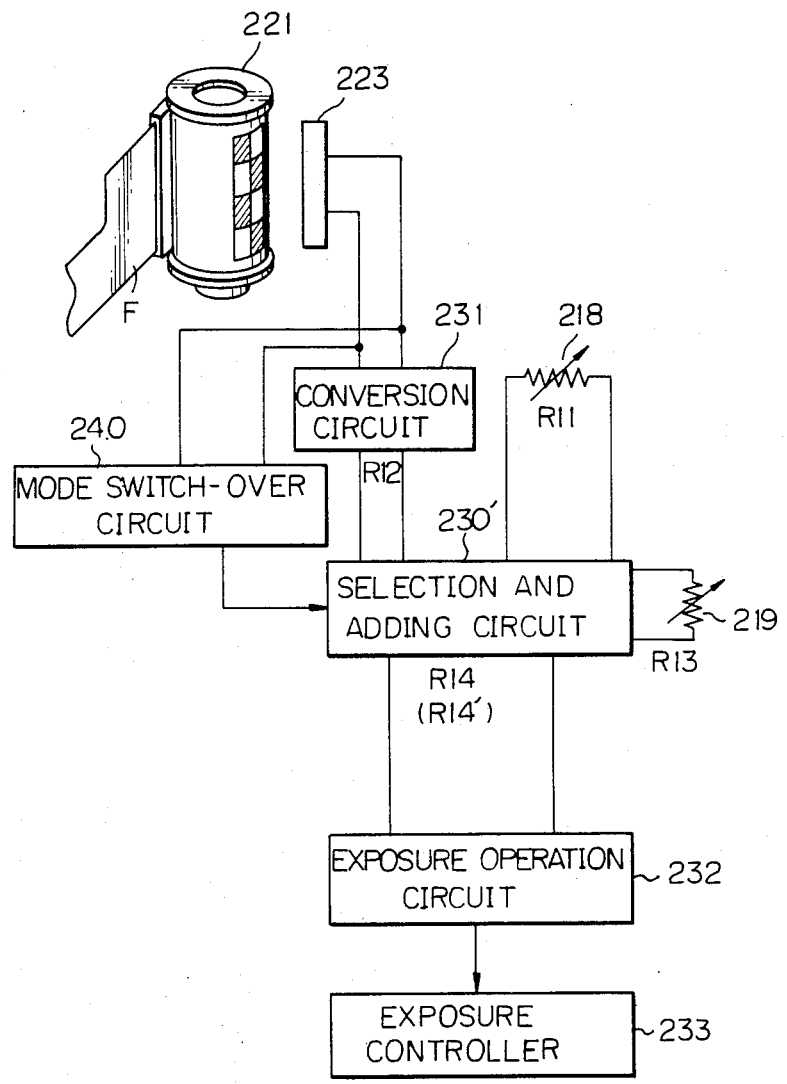
FIG. 11 is a block diagram showing an electric circuit of a fourth embodiment of the present invention.

It is also possible, as shown in FIG. 11, to dispense with the selector switch 220, by employing a mode switch-over circuit 240 which functions in response to the detection signal from the detecting device 223 and which causes the selection and addition circuit to preferentially adopt the automatic setting mode. In the absence of code indicia on the film container, the detecting device 223 does not release a detection signal, whereby the selection and addition circuit 230' selects the resistance R11 of the variable resistor 218, which is added to the resistance R13 for exposure correction. On the other hand, in the presence of code indicia on the film container, the detection signal from the detecting device 223 is supplied to the conversion circuit 231 and the mode switch-over circuit 240.

In response to said detection signal, the mode switch-over circuit 240 releases an output signal, which causes the selection and addition circuit 230' to preferentially select the resistance R12 from the conversion circuit 231, instead of the resistance R11 of the variable resistor 218. The resistance R12 thus selected is added to the resistance R13 for exposure correction.

In the following there will be explained another embodiment in which the variable resistor 218 for manual film speed setting and the variable resistor 219 for automatic film speed setting in the foregoing embodiment are constructed by a continuous resistor.

Figure 12:
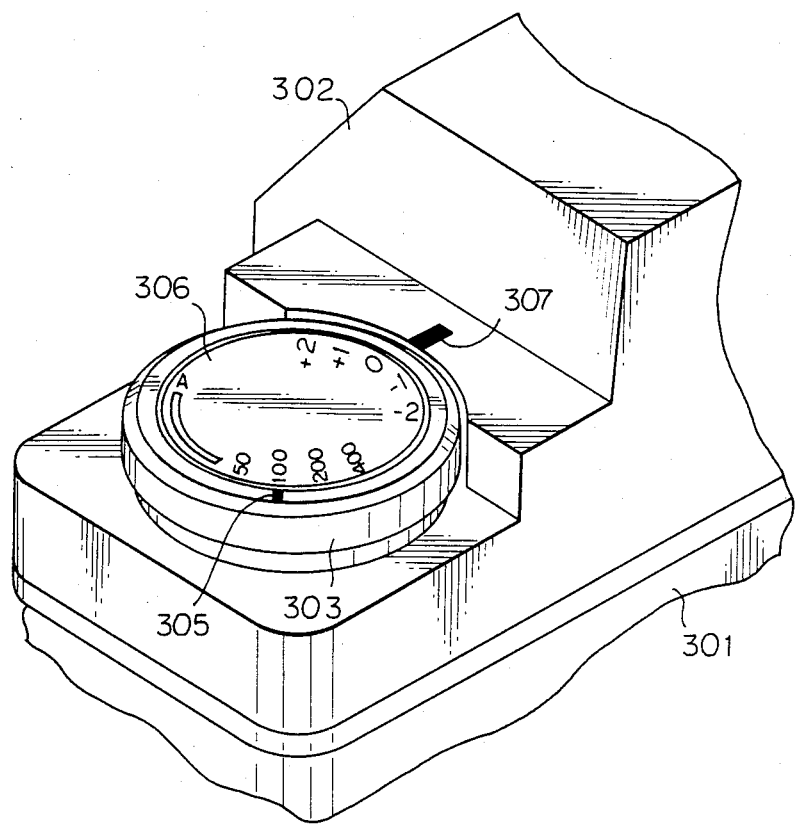
FIG. 12 is a partial perspective view of a camera in which a fifth embodiment of the present invention is applied.

Referring to FIG. 12, a film speed setting dial 303, rotatably provided on an upper cover 302 of a camera body 301, is provided with a pointer mark 305 on the upper edge, and an indicator disk carries a film speed scale and a symbol "A" indicating automatic film speed setting mode to be matched with said pointer mark 305, and an exposure correction scale to be matched with a pointer mark 307 provided on said upper cover 302.

As shown in FIG. 13, the indicator disk 306 is adhered onto a disk 311 supported by a shaft 309, and a disk 313 with plural circumferential notches is fixed to the lower end of said disk 311. Said notches respectively correspond to the graduations of the exposure correction scale from +2 to −2 EV, and a click spring 315 meets one of said notches when the pointer mark 307 is matched with one of the graduations.

The setting dial 303 and the disk 311 are mutually rotatably fitted, with an on dulating sheet spring 316 therebetween to constantly bias the setting dial 303 downwards. As shown in FIG. 14, the setting dial 303 is provided, on the lower face thereof, with plural grooves 317 respectively corresponding to the graduations of film speed scale from ISO 50 to 400 and a groove 318 corresponding to the symbol "A" for automatic setting mode, and the disk 313 is provided, on the upper face thereof, with a projection 319 capable of engaging with said grooves.

Furthermore, the setting dial 303 is provided with an axially elongated key groove 320, and a brush disk 322 rotatably supported by the shaft 309 is provided with a projecting key 321 adapted to engage with said key groove 320.

The brush disk 322, linked with the setting dial 303 through said key 321, is provided, on the lower face thereof, with a brush 323 which is in contact with a resistor strip 325 and a conductor 326 formed on a fixed circuit board 324. The resistor 325 shows a resistance proportional to the rotary angle of the brush 323, or of the setting dial 303, and each graduation of the film speed scale and the exposure correction scale corresponds to a rotary angle of 20°.

Thus the setting dial 303 rotates the disk 311 through the grooves 317, 318 and the projection 319, and the brush disk 322 through the key groove 320 and key 321. When the setting dial 303 is lifted, the groove 317 and 318 is disengaged from the projection 319, so that the dial 303 is disengaged from the disk 311. Thus, in this state, the setting dial only rotates the brush disk 322 alone through the key groove 320 and key 321, whereby the brush 323 can be displaced with respect to the film speed scale on the indicator disk 306.

Figure 15:
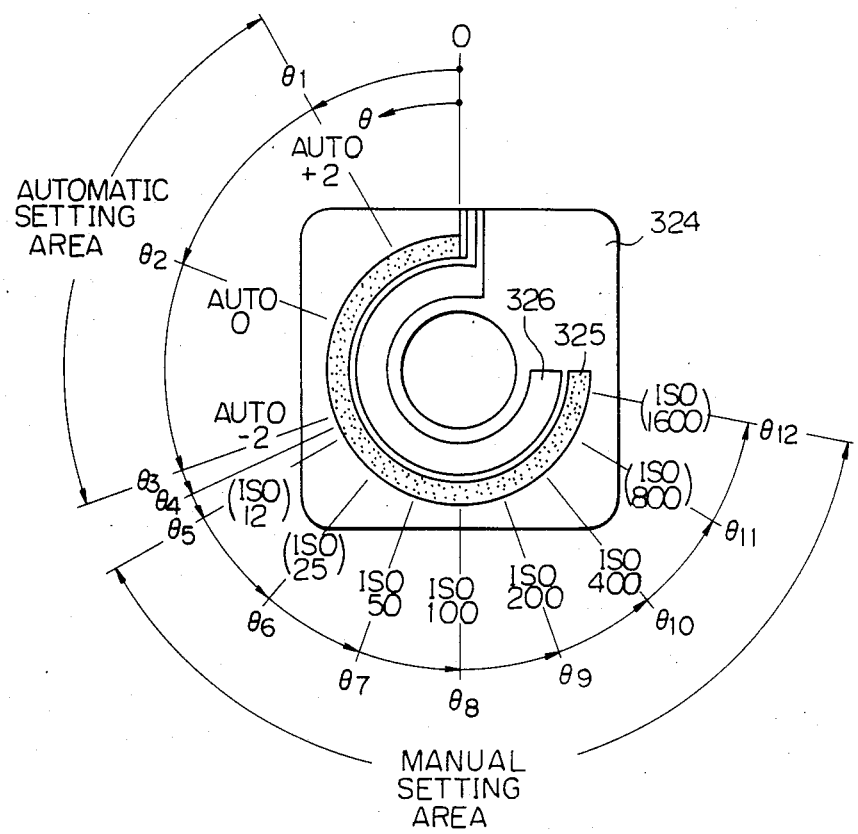
FIG. 15 is a plan view of a fixed circuit board shown in FIG. 13.

FIG. 15 is a plan view of the fixed circuit board 324, wherein the angular positions of the brush 323 in the exposure correction and film speed setting by the setting dial 303 are indicated by $\theta 1$ to $\theta 12$. With the increase in the rotary angle $\theta$ of the contacts, the output resistance R21 of a variable resistor composed of the brush 323, resistor 325 and conductor 326 becomes larger and the represented film speed increases. The brush 323 slides, in the automatic film speed setting mode, an automatic setting area from $\theta 1$ to $\theta 3$ in front of a boundary angular position $\theta 4$, and, in the manual setting mode, it moves in a manual setting area from $\theta 5$, beyond said boundary position $\theta 4$ to $\theta 12$.

The brush 323 is positioned at $\theta 2$ when a zero exposure correction is selected and the pointer mark 305 is matched with the symbol A for automatic setting mode, and said brush moves from $\theta 1$ to $\theta 3$ corresponding to exposure corrections from $+2$ to $-2$ EV. On the other hand, when the setting dial 303 is rotated to match the pointer mark 305 with a graduation for ISO 100 while the exposure correction is maintained at zero, the brush contact moves from $\theta 2$ to $\theta 8$, and the brush moves from $\theta 6$ to $\theta 10$ corresponding to exposure corrections from $+2$ to $-2$ EV while the film speed is maintained at ISO 100.

In the following the resistance R21 of the variable resistor from a position $\theta = 0$ to a rotary position $\theta n$ is represented by $R(0, \theta n)$. Thus, in the automatic setting mode, the resistance R21 changes from $R(0, \theta 1)$ to $R(0, \theta 3)$ corresponding to a change in the exposure correction from $+2$ to $-2$. In the manual setting mode, the resistance R21 varies from $R(0, \theta 5)$ to $R(0, \theta 12)$ corresponding to changes in the film speed from ISO 50 to 400 and in the exposure correction from $+2$ to $-2$. The resistance of said variable resistor is transmitted to a circuit shown in FIG. 16.

Figure 16:
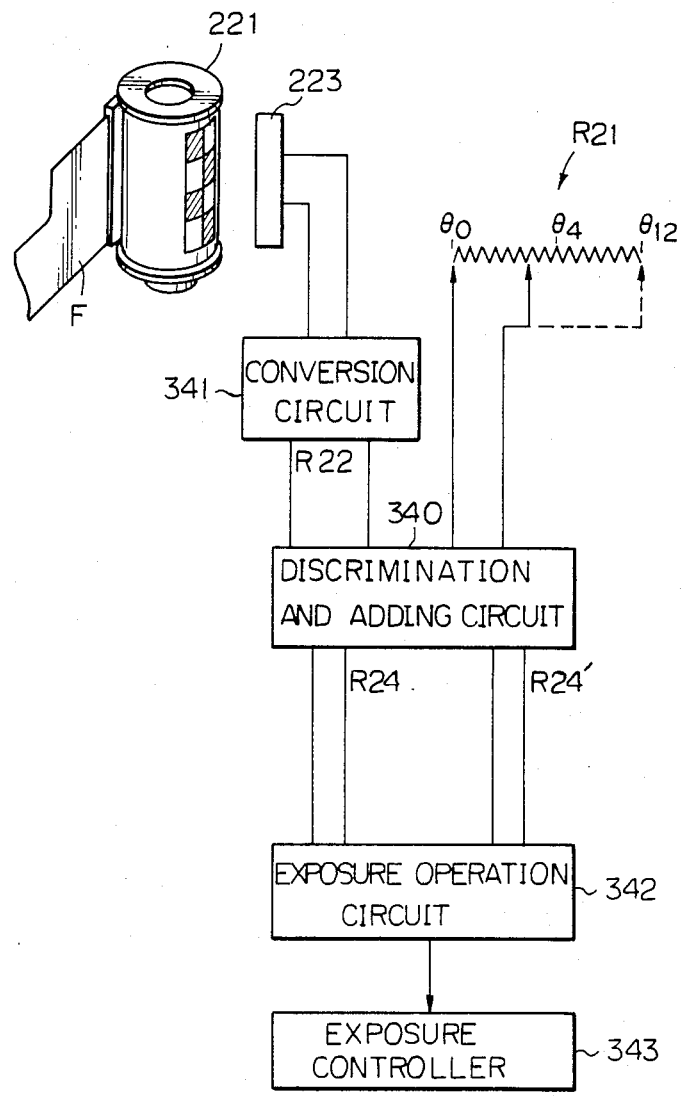
FIG. 16 is a block diagram of an electric circuit employed in the embodiment shown in FIG. 12.

In FIG. 16, a detecting device 223 for reading code indicia on a film container 221 provides a detection signal, which is converted in a conversion circuit 341 into a resistance value R22 and supplied to a discrimination and addition circuit 340. Also the resistance value R21 of the variable resistor regulated by the setting dial 303 is supplied to said discrimination and addition circuit 340.

In case the brush 323 is positioned in the manual setting area so that the resistance R21 is larger than a boundary resistance $R(0, \theta 4)$, the discrimination and addition circuit 340 is switched to the manual setting mode, whereby the resistance R21 is supplied, as the synthesized resistance R24, to the exposure operation circuit 342. On the other hand, in case the brush 323 is positioned in front of the boundary angle $\theta 4$ so that the resistance R21 is smaller than said boundary resistance $R(0, \theta 4)$, the discrimination and addition circuit 340 is switched automatically to the automatic setting mode, whereby said circuit 340 adds the resistance R22 from the conversion circuit 341 to the resistance R21 of the variable resistor and transmits the synthesized resistance R24' to the exposure operation circuit 342.

In the following there will be explained the function of the above-explained embodiment, in the manual setting of the film speed and in the automatic setting.

(1) Manual setting:

It is assumed that a film of a speed of ISO 100 is loaded in the camera. At first the setting dial 303 is lifted to disengage the groove 317 from the projection 319, and is then rotated to match the pointer mark 305 with a film speed graduation "100" whereby a groove 317 corresponding to the film speed ISO 100 engages with the projection 319. Subsequently the setting dial 303 is further rotated to match the pointer mark 307 with an exposure correcting graduation "0". The film speed setting is thus completed.

In the above-explained procedure, the brush disk 322 rotates integrally with the setting dial 303, whereby the brush 323 is placed at a position $\theta 8$ shown in FIG. 15. As the angle $\theta 8$ is larger than the boundary angle $\theta 4$ so that the resistance $R21 = R(0, \theta 8)$ of the variable resistor is larger than the boundary resistance $R(0, \theta 4)$, the discrimination and addition circuit 340 is switched to the manual setting mode, whereby the resistance R21 is transmitted, as the resistance R24, to the exposure operation circuit 342.

In case an exposure correction of $-2$ EV is desired in the photographing, the setting dial 303 is so rotated that the pointer mark 307 matches with an exposure correction graduation $-2$. In this case the setting dial 303 is rotated anticlockwise by two steps, so that the brush 323 moved from $\theta 8$ to $\theta 10$. Consequently, a resistance $R21 (= R(0, \theta 10))$ corresponding to a film speed of ISO 400 is supplied to the circuit 340. Since said resistance $R(0, \theta 10)$ is larger than the boundary resistance $R(0, \theta 4)$, said resistance $R(0, \theta 10)$ is transmitted, without change, to the exposure operation circuit as the resistance R24.

In this embodiment, if the speed of the loaded film is in a range from ISO 50 to 400, the angular position $\theta$ of the brush 323 is always larger than the boundary angular position $\theta 4$ in case of an exposure correction of $-2$ to $+2$ EV after film speed setting is made. Consequently the resistance R21 is always larger than the boundary resistance $R(0, \theta 4)$ and is transmitted, as the resistance R24, from the discrimination and addition circuit 340 to the exposure operation circuit.

(2) Automatic setting:

The setting dial 303 is lifted, then rotated until the pointer mark 305 matches with the symbol A and lowered, whereby the groove 308 engages with the projection 309. If the pointer mark 307 is positioned at zero exposure correction, the brush is located at $\theta2$.

In said position $\theta2$, the resistance $R21=R(0, \theta2)$ of the variable resistor becomes smaller than the boundary resistance $R(0, \theta4)$. When the setting dial 303 is so rotated that the pointer mark 307 meets an exposure correction of $+2$ EV or $-2$ EV, the brush rotates from $\theta2$ respectively to $\theta1$ or $\theta3$. The corresponding resistance $R(0, \theta1)$ or $R(0, \theta3)$ is smaller than the boundary resistance $R(0, \theta4)$. Consequently the automatic setting mode is identified by the discrimination and addition circuit.

On the other hand, when a film container bearing code indicia is loaded in the camera, the conversion circuit 341 releases the resistance R22. If said code indicia correspond to a film speed of ISO 100, the converted resistance R22 is equal to $R(\theta2, \theta8)$ which corresponds to a rotation from $\theta2$ to $\theta8$. Similarly, if the code indicia correspond to a film speed of ISO 50 or ISO 200, the resistance R22 from the conversion circuit corresponds to $R(\theta2, \theta7)$ or $R(\theta2, \theta9)$.

When the automatic setting mode is selected, the discrimination and addition circuit 340 discriminates the resistance value R21 and is switched to the automatic setting mode, whereby said circuit adds the resistance R21 of the variable resistor corresponding to the exposure correction set by the exposure correction scale to the resistance R22 from the conversion circuit 341, and transmits the synthesized resistance R24' to the exposure operation circuit.

In case of zero exposure correction for a film of ISO 100, the synthesized resistance R24' is obtained by:

$$R24' = R21 + R22$$
$$= R(0,\theta2) + R(\theta2, \theta8)$$
$$= R(0, \theta8).$$

Consequently the discrimination and addition circuit 340 transmits, to the exposure operation circuit, a resistance $R(0, \theta8)$ same as the resistance R24 when the film speed is manually set at a graduation "100", as the synthesized resistance R24'.

Then, in case an exposure correction of $+2$ EV is selected for the same film of ISO 100, the brush 323 is rotated clockwise by two steps (40°) to reach a position $\theta1$. Consequently the resistance R21 becomes $R(0, \theta1)$.

On the other hand, the resistance R22 obtained from the conversion circuit 341 remains unchanged since the film speed ISO 100 is not changed. Consequently the resistance R24' transmitted from the discrimination and addition circuit 340 to the exposure operation circuit 342 is determined by:

$$R24' = R21 + R22$$
$$= R(0, \theta1) + R(\theta2, \theta8).$$

It is to be noted that the angle from $\theta2$ to $\theta1$ corresponds to an exposure correction of two steps is equal to the angle from $\theta8$ to $\theta6$ corresponding to two steps in ISO film speed, both being 40°. Consequently $R(\theta2, \theta8)=R(\theta1, \theta6)$. Thus, the above-mentioned resistance R24' can be expressed as:

$$R24'=R(0, \theta1)+R(\theta1, \theta6).$$

Therefore the resistance transmitted to the exposure operation circuit is equal to the resistance when the film speed is manually set at ISO 25.

What we claim is:

1. An exposure correcting device for use in a camera adapted for use with a film container bearing code indicia representing film speed, comprising:
   manual setting means for manually entering a film speed;
   correction value setting means for manually entering an exposure correction value;
   signal producing means for producing a signal corresponding to the combination of said film speed entered by said manual setting means and of said exposure correction value entered by said correction value setting means;
   reading means for reading the code indicia of said film container;
   mode selecting means for selecting either a manual mode in which the film speed is manually set or an automatic mode in which the film speed is automatically set; and
   exposure determining means adapted to determine an exposure value according to the signal from said signal producing means when said manual mode is selected, and to determine an exposure value according to the signal from said signal producing means and the code indicia read by said reading means when said automatic mode is selected.

2. An exposure correcting device according to claim 1, wherein said exposure determining means is adapted, in said manual mode, to determine the film speed by reading the aforementioned signal as a code representing the film speed, or, in said automatic mode, to read said signal as an exposure correction value and to modify the film speed indicated by said code indicia according to said exposure correction value.

3. An exposure correcting device according to claim 1, wherein said signal producing means comprises scale means and electric contact means which are mutually displaced in response to said manual setting means, wherein said scale means is adapted to generate an electric output signal corresponding to the relative position to said electric contact means, and said correction value setting means is adapted to modify said relative position.

4. An exposure correcting device for use in a camera adapted for use with a film container bearing code indicia representing film speed, comprising:
   manual setting means for manually entering a film speed;
   correction value setting means for manually entering an exposure correction value;
   signal producing means for producing a signal corresponding to the combination of said film speed entered by said manual setting means and of said exposure correction value entered by said correction value setting means;
   reading means for reading the code indicia of said film container;
   mode selecting means for selecting either a manual mode in which the film speed is manually set or an automatic mode in which the film speed is automatically set; and
   exposure determining means adapted to determine an exposure value according to the signal from said signal producing means when said manual mode is selected, and to determine an exposure value according to the film speed corresponding to said code indicia and to the exposure correction value entered by said correction value setting means when said automatic mode is selected.

5. An exposure correcting device according to claim 4, wherein said exposure determining means comprises means for adding said exposure correction value to the film speed corresponding to said code indicia when said automatic mode is selected.

6. An exposure correcting device for use in a camera adapted for use with a film container bearing code indicia representing film speed, comprising:

manual setting means for manually entering first data representing film speed;

correction value setting means for manually entering second data representing an exposure correction value;

reading means adapted for reading the code indicia of said film container and producing third data corresponding to the film speed represented by said code indicia;

mode selecting means for selecting either a manual mode in which the film speed is manually set or an automatic mode in which the film speed is automatically set; and exposure determining means adapted to determine an exposure value according to said first and second data when said manual mode is selected, and to determine an exposure value according to said second and third data when said automatic mode is selected.

* * * * *